Patented Mar. 13, 1951

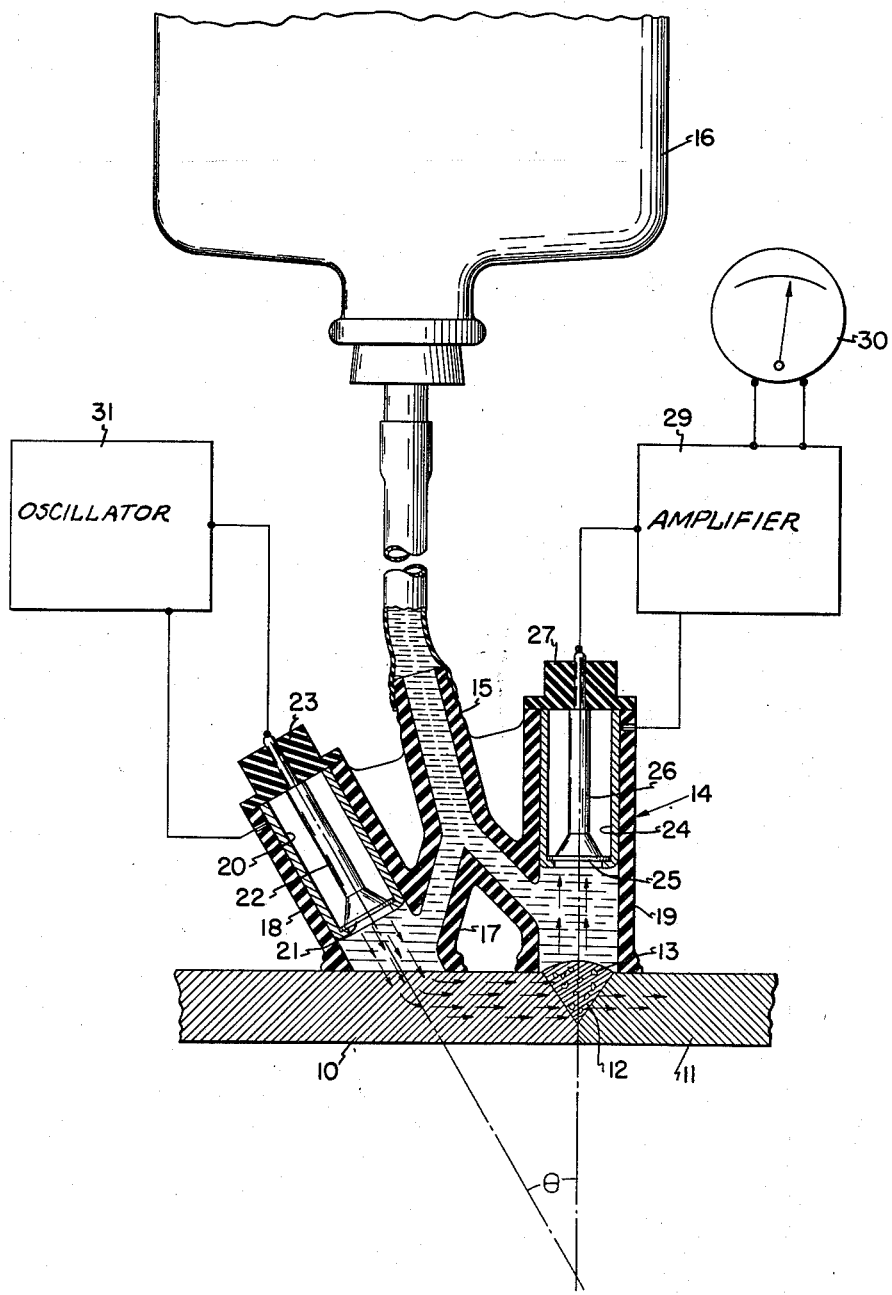

2,545,309

UNITED STATES PATENT OFFICE 2,545,309

WELD TESTING INSTRUMENT

Rex S. Roberts, Belmont, Mass., assignor to Transducer Corporation, Boston, Mass., a corporation of Delaware Application May 29, 1948, Serial No. 30,088

6 Claims. (Cl. 73—67)

This invention relates to the testing of welds in welded metals by ultrasonic energy.

The welds in welded metals may be faulty due to the lack of continuity between the parent metal and the weld metal, and due to the number and size of slag pockets which may exist within the weld metal. It is desirable to be able to test the quality of welds from one side of the welded metals, as in the case of large pipes, boilers, tanks, and hulls. It is also desirable to be able to make the tests either directly after the welds are made or in the field.

This instrument provides a readily portable and easily operated test instrument for indicating directly the quality of welds of welded metals. In one embodiment of the invention, ultrasonic energy is produced by a piezo-electric crystal and directed into a pocket of water held by a rubber envelope against a welded plate. The resulting wave is impinged against the plate at an angle slightly less than the critical angle between the water and the welded metal. The wave length of the energy is made substantially equal to the minimum diameter of troublesome slag pockets which might occur in the welds, so that the wave will move more or less unimpeded through a good weld. If discontinuity or excessive slag is present, the wave will be broken up and a considerable part of its energy will be reflected up into the bead of the weld. Another pocket of water is held by a rubber envelope over the weld and the vibrations from the weld are transmitted through the water to a receiving crystal. By comparing the amplitude of the signal received by the receiving crystal from a weld under test with the amplitude of a signal from a weld of standard quality, the quality of the weld being tested can be determined. Signals from the weld being tested which are stronger than a signal from a weld of standard quality would indicate a defective weld.

An object of the invention is to test the quality of welds in welded metals.

Another and more definite object of the invention is to test the quality of welds in welded metals with supersonic energy.

The invention will now be described with reference to the drawing, which is a diagrammatic view, with portions in section, of a weld-testing instrument embodying this invention.

The steel plates 10 and 11 have been welded together by the butt weld 12. The small, slag pockets 13 are in the weld.

For testing the weld, the rubber envelope 14 is placed against the plates in the welded area. The envelope has the inner tube 15 which is connected to the water-supply bottle 16. The water through the tube 15 is supplied past the splitter 17 into the lower ends of the transmitting tube 18 of the envelope, and into the lower end of the receiving tube 19 of the envelope.

The transmitting tube 18 has the metal cylinder 20 therein, the lower end of which terminates short of the lower end of the tube and has its lower wall turned in to form a seat for the piezoelectric crystal 21 which has its lower face in contact with the water column in the lower end of the tube 18. The upper face of the crystal 21 is contacted by the enlarged lower end of the rod 22, the upper end of which is held by the cap 23 on the upper end of the tube 18. The rod 22 holds the crystal in its seat so that it is deformed, but not moved bodily by the driving energy impressed upon it. The crystal is connected through the rod 22 which contacts its upper face, and through the cylinder 20 which contacts its lower face, to the high-frequency oscillator 31 which may have a frequency of 1.5 megacycles.

The receiving tube 19 has the metal cylinder 24 therein, with its lower end terminating short of the lower end of the tube, and has its lower wall turned in and forming a seat for the piezoelectric crystal 25 which has its lower face in contact with the column of water in the lower end of the tube 19. The enlarged, lower end of the rod 26 contacts the upper face of the crystal 25, the upper end of the rod being held by the cap 27 on the upper end of the tube 19. The rod 26 prevents displacement of the crystal 25 when it is deformed by vibrations reaching it through water. The amplifier 29 is connected to the meter 30. The crystal 25 is connected through the rod 26 which contacts its upper face, and through the cylinder 24 which contacts its lower face, to the amplifier 29, which, in turn, is connected to the meter 30.

The tube 19 is placed centrally over the weld 12, with its axis perpendicular to the upper surfaces of the plates 10 and 11.

The axis of the tube 18 is arranged at the angle $\theta$ to the axis of the tube 19, which angle is, in the embodiment illustrated, about 29°. Assuming the velocity of sound through steel plate to be about twice that of sound in water, an angle of 30° would be the critical angle at which reflection would cause a wave generated by the crystal 21 to proceed longitudinally through the plate, but at which little energy would be introduced into the steel. By making the angle slightly less than 30°, more energy will be introduced into the plate and will move in the desired direction towards the weld.

A wave length, corresponding to a frequency of 1.5 megacycles, is selected as being roughly equal to the minimum diameter of troublesome slag pockets in the welds and which is estimated to be about 1/16", and the oscillator 31 at that frequency causes the crystal 31 to introduce, through the water column between its lower face and the plate 10, energy at that frequency which will move through the plate 10 towards the weld 12.

If discontinuity between the weld metal and the metal of the plates 10 and 11 exists, or if excessive slag is present in the weld, the wave will be broken up at the weld and reflected upwardly through the water column in the tube 19 against the lower face of the crystal 25, causing it to vibrate. The resulting electric energy generated by the crystal 25 is amplified by the amplifier 29 and indicated by the meter 30.

The indication on the meter resulting from a weld under test would be compared with that resulting from the testing of a standard-quality weld; and, if the signal from the weld under test were stronger than that from a good weld, it would indicate the weld under test was defective. The stronger the signal reflected by the weld under test, the poorer the weld.

While a single rubber envelope has been disclosed as providing water columns for both the transmitting and receiving crystals, separate envelopes, which could be of other sound-absorbing material, could be used for each crystal.

While water has been described as the coupling liquid, other inexpensive and readily available liquids could be used.

While one embodiment of the invention has been described for the purpose of illustration, it should be understood that the invention is not limited to the exact apparatus or arrangement of apparatus illustrated, as departures therefrom may be suggested by those skilled in the art without departure from the essence of the invention.

What is claimed is:

1. A weld-testing instrument comprising an electromechanical transducer; means providing a sonic column for coupling said transducer to a welded plate at one side of a weld therein; an electromechanical receiver; means providing a sonic column for coupling said receiver to the weld in the plate at said one side thereof; a high-frequency oscillator connected to said transducer; and means connected to said receiver for indicating the intensity of the energy reflected by the weld, the axis of the second-mentioned sonic column extending through the weld perpendicular to the surface of the plate, and the axis of the first-mentioned sonic column being arranged at an angle slightly less than the critical angle at which refraction causes the energy, generated by the transducer, to proceed longitudinally through the plate towards the weld.

2. A weld testing instrument comprising a housing adapted to be placed against one side of a welded plate, means forming two sonic columns in said housing, said columns having corresponding ends terminating at the plate, said columns having longitudinal axes intersecting on the other side of said surface and forming an acute angle, an electromechanical transducer connected to the other end of one of said columns so as to direct energy along its said axis, a high frequency oscillator connected to said transducer, an electromechanical receiver connected to the other end of the other of said columns so as to receive energy reflected from a weld along its said axis, and means connected to said receiver for indicating the intensity of the energy reflected by a weld, said axis of said one of said columns being at an angle to a line perpendicular to the plate which is less than the critical angle at which refraction causes energy generated by the transducer to proceed longitudinally through the plate towards the weld.

3. A weld testing instrument as claimed in claim 2 in which the axis of the said other column is substantially perpendicular to the plate.

4. A weld testing instrument as claimed in claim 2 in which the housing comprises resilient, vibration absorbing material separating the two columns.

5. A weld testing instrument as claimed in claim 2 in which the said axis of the said other column is substantially perpendicular to the plate, and in which the housing comprises resilient, vibration absorbing material separating the two columns.

6. An instrument for testing a weld in a welded plate comprising means providing a first sonic column having a surface at one end for contacting one side of a plate alongside a weld therein, an electromechanical transducer at the other end of said column, a high frequency oscillator connected to said transducer, means providing a second sonic column having a surface at one end thereof for contacting a weld in said plate at said one side thereof, an electromechanical receiver at the other end of said second column, and means connected to said receiver for indicating the intensity of the energy reflected by the weld, said columns having longitudinal axes which intersect in an acute angle on the other side of the plate, said axis of said first column being arranged at an angle to a line perpendicular to the plate which is less than the critical angle at which refraction causes energy generated by the transducer to proceed longitudinally through the plate towards the weld.

REX S. ROBERTS.

REFERENCES CITED

The following references are of record in the file of this patent:

UNITED STATES PATENTS

| Number | Name | Date |
|---|---|---|
| 2,378,237 | Morris | June 12, 1945 |
| 2,431,862 | Carlin | Dec. 2, 1947 |
| 2,443,963 | Tarbox et al. | June 6, 1948 |
| 2,463,328 | Sproule | Mar. 1, 1949 |
| 2,527,986 | Carlin | Oct. 31, 1950 |

FOREIGN PATENTS

| Number | Country | Date |
|---|---|---|
| 654,673 | Germany | Dec. 15, 1935 |